Patented Apr. 10, 1951

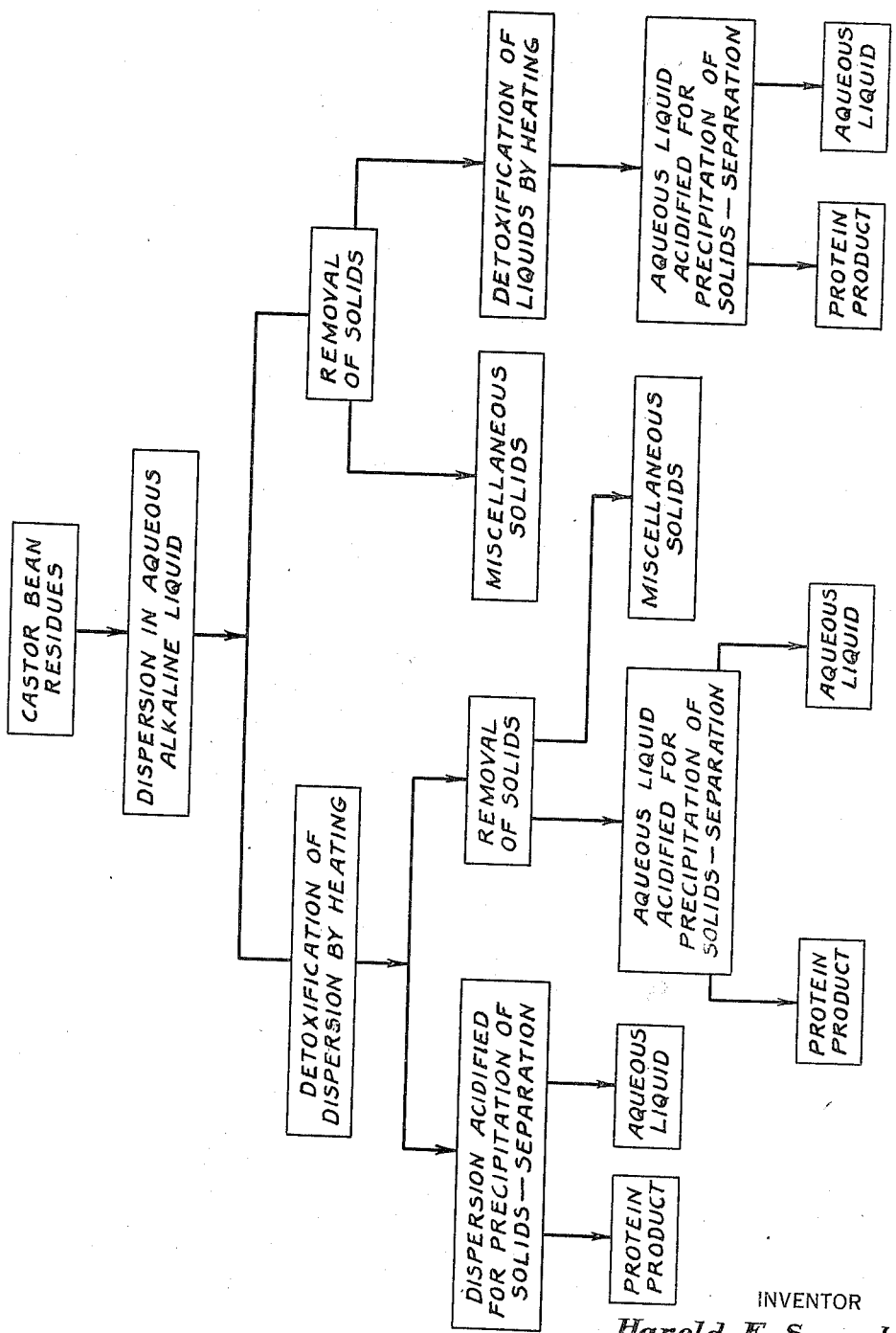

2,547,980

UNITED STATES PATENT OFFICE 2,547,980

METHOD FOR DETOXIFYING CASTOR BEAN PROTEINS

Harold F. Saunders, Shaker Heights, Ohio, assignor to The Sherwin-Williams Co., Cleveland, Ohio, a corporation of Ohio Application September 11, 1947, Serial No. 773,482

14 Claims. (Cl. 260—123.5)

This invention relates to processes for preparing substantially non-toxic, proteinaceous materials from castor beans and to the products of such processes. More particularly it relates to processes for preparing such products which are readily and easily dispersible in aqueous liquids.

The meal or residue remaining after the extraction of oil from the castor bean normally contains substances toxic to both humans and animals. One of these substances is an albumin type of protein called ricin. In addition the bean contains small quantities of ricinine, a toxic alkaloid of the pyridine series, and also some allergens.

After the oil has been extracted from the castor bean, a cake or pomace remains which contains large quantities of proteinaceous materials, cellular material, cortex, unless removed initially, carbohydrates, the above mentioned toxic substances and small amounts of other compounds. If a solvent extraction process were used for recovering the oil, a portion of the solvent will also be present in the pomace or residue.

In order to prepare suitable proteinaceous products from this residue, it is imperative to eliminate the toxic substances, either by removing them as such or by converting them by decomposition to non-toxic and harmless substances.

Several methods for detoxifying the castor bean residue has been used in the past but all of these methods entail various disadvantages. For example, when attempting to remove ricin from the residue by leaching with boiling water, a large proportion of the desirable proteins and proteoses are also removed and the removal of the ricin is incomplete. When destruction of the ricin is carried out at high temperatures, the dispersibility and solubility of the protein products is largely destroyed, thus rendering the product useless for many purposes. Furthermore, the proteinaceous materials are degraded to such an extent that they are unfit for use as emulsion stabilizers and the like.

According to the present invention, these disadvantages are overcome and a substantially completely detoxified proteinaceous product is obtained, which has all the desired characteristics as to dispersibility and solubility and is capable of stabilizing emulsions.

In its broadest aspect the invention calls for detoxifying the castor bean residue by heating the same at atmospheric pressure while in a highly dispersed state.

Although ricin is water-soluble and should be capable of being removed by merely washing the residue with hot water, this method is unsatisfactory since the ricin, as with other types of proteins, clings to or is enmeshed or occluded with other proteins so that it cannot be removed solely by washing. It has been found, however, that the ricin can be dispersed to a high degree and thus become vulnerable to treatment under mild conditions, when a large proportion of the alkali-soluble proteins in the residue are in a dispersed phase. Under these conditions the ricin may be converted to harmless substances, by merely heating the dispersion to a relatively low temperature which will not seriously affect the properties of the proteins.

The first stage of the present process is, therefore, to prepare an alkaline dispersion by adding sufficient water and alkali to the pomace or residue to solubilize the water-soluble proteins and a large proportion of the alkali-soluble proteins.

The dispersion is then heated to a temperature within the approximate range of from about 80° C. to about 95° C. to effect the detoxification. These temperatures will have little or no degrading effect on the proteins.

After the detoxification by heating, the dispersion can be treated with an acid, or an acid reacting compound to neutralize or acidify the dispersion so that a maximum quantity of the solubilized proteinaceous material will be precipitated. If desired, the detoxified dispersion may be filtered or centrifuged to separate miscellaneous solid materials prior to the treatment with acid to precipitate the solubilized proteins. Also, if desired, these miscellaneous solids can be separated from the dispersion prior to the detoxification step.

After detoxification, precipitation (with or without prior removal of miscellaneous solids) and removal of all or a large proportion of the remaining water or aqueous liquid by settling, filtering or centrifuging, a detoxified product is obtained in which the proteinaceous materials are substantially undegraded and have the desired properties and characteristics.

The invention which is illustrated in the accompanying flow sheet will now be described in greater detail.

It is preferred to start with pomaces or residues from oil extraction processes in which the castor bean has been decorticated prior to oil extraction. It is to be understood, however, that the employment of pomaces from undecorticated castor beans is within the scope of the present invention since the presence of cortex does not impair the usefulness of the final composition for certain purposes, such as fertilizers or binders for plastics, where color and insoluble particles are not a consideration. When dispersions are made up from pomaces containing cortex, a dark brown coloration is present and, although the cortex is insoluble, the product may be used in certain applications.

The pomace remaining after extraction of the oil from castor beans is treated with water and alkali. The quantity of water used is preferably sufficient to produce about a 1% to about a 3% protein solution, calculating the protein content as 6.25 times the nitrogen content. ("The Official and Tentative Methods of the Association of Official Agriculture Chemists," fourth edition, 1935, page 355). At about 5% protein concentration the proteins do not appear to be in a sufficiently dispersed state to detoxify easily, probably being to a considerable extent entangled in the cellular components. Below 1% the quantity of water is too great for economical processing.

The alkali has a number of functions. Its presence retards or prevents the tendency of the pomace to agglomerate into lumps when mixed with the water. It aids in opening up the cellular structure and freeing the proteins. It solubilizes and disperses the alkali-soluble proteins. It controls and retards the coagulation of proteins under the temperatures involved. Dispersions of proteins in water tend to coagulate when heated to temperatures above about 55° C., and these coagulates are not easily redispersed in alkaline solutions. The coagulation, however, is inhibited by the alkali. As the pH value of the aqueous dispersion of castor protein increases above 7.0 pH the temperature at which the coagulation takes place rises, so that with a pH value of from about 9 to 11 the solution will withstand a temperature of 90° C. or even higher without visible coagulation. It is, therefore, preferable to add sufficient alkali to give the mixture a pH value of from at least 9 and preferably about 11. pH values above 11 may be used to secure a higher degree of protein solubilization but such pH values have adverse effects on the proteins. It is generally sufficient to stir the mixture for about 30 minutes in order to obtain an adequate dispersion of the proteins. Sodium hydroxide is the preferred dispersing alkali but any soluble alkali or alkaline salt or combination thereof may be used satisfactorily, i. e. potassium hydroxide, ammonia, sodium, or potassium carbonates, alkaline sulphites or sulphates, etc.

The pomace resulting from solvent extraction processes for recovering the oil is wetted with the solvent employed. In my co-pending patent application, Serial No. 773,481, now Patent No. 2,502,484, a method has been described for recovering solvent from such solvent-wetted pomaces without passing through a dry state by the use of temperatures of around 35° C. to 40° C. under partial vacuum while mixed with an aqueous liquid. This method for desolventizing the solvent-wetted castor pomaces can be employed with the aqueous alkaline dispersion of the pomace in the present process.

It is not essential when carrying out the present process to completely remove all of the solvent before proceeding with the detoxification of the castor bean pomace, since the temperatures of the subsequent steps of this process will assist in driving off any solvent which might still be present.

The suspension or slurry is now composed of insoluble cellular components of the castor bean, alkali-insoluble proteins and cortex (if undecorticated beans were employed) in a dispersion of water-soluble and alkali-soluble protein and other water-soluble compounds. This suspension is then heated preferably to 90° C. and held at that temperature with agitation for a short period such as 5 to about 25 minutes. Usually about 15 minutes is sufficient to effect complete detoxification.

After heating the dispersion, the toxicity of the ricin and also the ricinine is destroyed, thus rendering the mixture non-toxic and safe to use for a multitude of purposes, previously excluded.

The dispersion or slurry is then cooled to below about 60° C. and acidified with dilute acid to a pH value of from about 3.8 to about 4.0 which causes maximum precipitation of castor proteins. If acidification is carried out above about 60° C., the proteins tend to coagulate and are not easily redispersed in alkaline solution. The solids in the suspension now consist principally of the cellular components of the castor bean, the alkali-insoluble proteins, and the acid-precipitable proteins. The non acid-precipitable proteins, proteoses and the like remain in solution, together with other water-soluble compounds. The solids are then separated from the liquids by filtration or centrifuging, washed with water acidified to about 3.8 to 4.0 pH, dried and, if desired, pulverized, or preferably, left as a water-wetted composition which may be protected against putrefaction by the addition of a protein preservative such as the sodium salt of chlorinated phenol.

As an alternative procedure, the suspension or slurry, after being heated to about 90° C., may be directly clarified, as by filtration or centrifuging. The solids in this case consist principally of the cellular components of the castor bean and the non-alkali soluble proteins. These solids may be dried and are useful as a fertilizer material. The liquids may then be cooled below about 60° C. and acidified with dilute acid to precipitate proteins. This protein precipitate is separated from the liquid in which the non acid-precipitable proteins and other water-soluble compounds are dissolved. The protein material is then washed with water, dried and pulverized, or it may be left in the water-wetted state. In another alternative procedure, the suspension or slurry may be clarified before the step of detoxifying by heating to about 90° C. The clarification of the slurry may be effected by filtering or centrifuging and the like.

For acidifying the liquids, dilute sulphuric acid may be used but any other inorganic or organic acid which will precipitate the protein may be used, such as hydrochloric, sulphurous or acetic acid. Acidic salts, $SO_2$ gas, etc. may also be used.

To more clearly describe the present invention, reference will now be made to the following illustrative examples:

*Example I*

The solids remaining after extracting the oil with heptane from decorticated castor beans contain approximately 50% solids and 50% heptane. An aqueous solution of caustic soda having a pH value of 11.0 was slowly added to the solids while rapidly stirring until a fluid suspension resulted. Additional aqueous alkaline solution was then added while stirring to give a ratio of about two parts protein (N×6.25) to 100 parts aqueous alkaline solution. The pH value of the mixture was then corrected to 11.0 by addition of 5% caustic soda solution. The suspension was agitated thirty minutes and then flashed into a chamber at 28" vacuum. Heat was applied until the vapor temperature reached 35° C., while removing vapors through a vacuum pump. The vapors were condensed by cooling, and the heptane separated from the condensate for reuse in the extraction process. The suspension was then further heated to 90° C. at atmospheric pressure and held at 90° C. for 15 minutes, after which it was cooled to 50° C. and acidified to 3.9 pH by the addition of a 5% sulphuric acid solution. The solids were separated from the liquid in a solid bowl centrifuge, washed with water acidified to 3.9 pH, dried and pulverized.

The dried solids analyzed 14.1% nitrogen (88% protein) and contained the fine structured cellular component of the castor bean kernel. This proteinaceous composition was of excellent light color, easily dispersible in alkali at 9 pH and substantially non-toxic. The cellular component did not solubilize in the alkaline solution but was in such an exceedingly fine state of division that it was uniformly dispersed and gave no appearance of specks when spread as a film on glass.

The toxicity was determined by feeding to rats. When rats were fed a ration composition consisting of 5% of the original castor pomace and 95% of an accepted commercial animal feed containing dried meat, dried fish, bone meal and or cereals, they showed external symptoms of poisoning within a few hours, i. e. hunched posture, matted fur, nasal discharge, diarrhea— and die within 12 to 24 hours.

With a similarly prepared ration in which the original castor pomace was replaced by the solid composition, prepared as described in this example, the animals did not show these symptoms and continued to live and grow at normal rate with normal food consumption. The percentage of the castor composition may be increased from 5% to 10% with similar effect although above 10% the ration appears to be unpalatable.

Example II

A heptane-wetted pomace resulting from the extraction of oil from decorticated castor beans with heptane was desolventized by drying in thin layers at about 70° C. To the dry pomace was added a small amount of aqueous solution of sodium hydroxide of 11.0 pH value, further slow addition of the solution was made until the mixture became fluid. Additional solution was then added until the total quantity of solution reached an amount equivalent to fifty times the weight of proteins in the pomace, calculating the protein content as 6.25 times the nitrogen content. The mixture was then thoroughly homogenized by circulation through a rotary pump and the pH value was corrected to 11.0 as in Example I. The mixture was then heated by direct steam to 90° C. while agitating and this temperature was maintained for 15 minutes. The insoluble residue was removed from the liquid and dried. The solids contained 3.4% protein, the balance being principally cellular material and is useful as a fertilizer or a binding material.

The clarified liquid was cooled to 50° C. and a 5% solution of sulphuric acid added slowly with agitation until a pH of 3.9 was obtained. The precipitate was separated from the liquid, washed with water acidified to 3.9 pH, dried and pulverized. The remaining liquids contain the soluble nitrogen compounds such as proteoses, etc. and other water-soluble materials. The precipitate analyzed 16.1% N (protein 100%) and was easily dispersible in alkaline solutions. When fed to rats in the manner previously described, the animals ate freely and showed normal weight gains.

The exact composition of the product may vary somewhat according to type of castor bean treated, effectiveness of the dispersing step, degree of alkalinity maintained and other factors. Generally castor compositions prepared as described will contain between 75% and 90% of proteins calculated as nitrogen times 6.25, the balance being principally cellular matter in exceedingly fine state of division (and cortex if undecorticated beans were taken). The allergens of castor beans appear to be soluble in water and are removed with the liquids and wash waters under the conditions described, so that the products exhibit substantially no allergenic properties.

It is known that ricinine is decomposed by sulfuric acid, so that whatever portion of this alkaloid is not destroyed by the heating step will be decomposed by the later acid precipitation of proteins.

Although the present invention has been described with specific reference to particular examples, it will be understood that various modifications and variations in the process which would be apparent to one skilled in the art are not excluded and that the scope of the present invention is defined by the appended claims.

What is claimed is:

1. A process for treating castor bean pomace to eliminate toxins comprising mixing the pomace with an aqueous alkaline solution to solubilize at least a portion of said pomace and heating the solution containing the solubilized portion to a temperature within the range of from about 80° C. to about 95° C. to destroy said toxins.

2. A process as claimed in claim 1 wherein undissolved matter in the mixture of pomace and aqueous alkaline solution is separated from the solution prior to heating to destroy the toxins.

3. A process as claimed in claim 1 further comprising separating undissolved matter from the solution after heating to destroy the toxins.

4. A process as claimed in claim 1 wherein the mixture of pomace and aqueous alkaline solution has a pH value of from about 7.0 to about 11.0.

5. A process as claimed in claim 4 wherein the pH value is from about 9.0 to about 11.

6. A process as claimed in claim 5 wherein the pH value of the mixture is 11.

7. A process as claimed in claim 1 wherein the aqueous alkaline solution comprises an aqueous solution of sodium hydroxide.

8. A process as claimed in claim 1 further comprising acidifying the solution following the heating step to precipitate solubilized material in said solution.

9. A process as claimed in claim 8 wherein the solution is acidified to a pH of from about 3.8 to about 4.0.

10. A process as claimed in claim 8 wherein the solution is cooled to a temperature below about 60° C. prior to acidification.

11. A process as claimed in claim 8 wherein the acidification is carried out by adding a 5% solution of sulfuric acid to said solution.

12. A process for treating castor bean pomace to eliminate toxins comprising mixing the pomace with an aqueous alkaline solution to form a dispersion having a pH value of from about 9 to about 11, the amount of solution added being sufficient to produce a protein concentration of from about 1% to about 3%, heating said mixture to from about 80° C. to about 95° C. for a period of from about 5 minutes to about 25 minutes to destroy said toxins, cooling said detoxified dispersion to a temperature not higher than 60° C., adding sufficient acidic substance to lower the pH value to from about 3.8 to about 4 to precipitate a large proportion of the solubilized proteinaceous material, and separating at least a portion of the liquids from the solids including the precipitated material.

13. A process as claimed in claim 12 wherein those solids present are removed from the dispersion after the detoxification step and prior to the acidification step.

14. A process as claimed in claim 12 wherein those solids present are removed from the dispersion prior to the detoxification step.

HAROLD F. SAUNDERS.

REFERENCES CITED

The following references are of record in the file of this patent:

UNITED STATES PATENTS

| Number | Name | Date |
|---|---|---|
| 1,866,698 | Bronsztajn | July 12, 1932 |
| 2,233,213 | Kniseley et al. | Feb. 25, 1941 |
| 2,238,329 | Julian et al. | Apr. 15, 1941 |
| 2,331,619 | Morse | Oct. 12, 1943 |
| 2,467,402 | Pascal | Apr. 19, 1949 |